(12) United States Patent
Hao

(10) Patent No.: US 9,971,212 B2
(45) Date of Patent: May 15, 2018

(54) ARRAY SUBSTRATE, LIQUID CRYSTAL DISPLAY PANEL, AND LIQUID CRYSTAL DISPLAY

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 224 days.

(21) Appl. No.: 15/023,378

(22) PCT Filed: Feb. 25, 2016

(86) PCT No.: PCT/CN2016/074526
§ 371 (c)(1),
(2) Date: Mar. 19, 2016

(87) PCT Pub. No.: WO2017/117850
PCT Pub. Date: Jul. 13, 2017

(65) Prior Publication Data
US 2017/0322466 A1 Nov. 9, 2017

(30) Foreign Application Priority Data
Jan. 6, 2016 (CN) .......................... 2016 1 0006125

(51) Int. Cl.
G02F 1/1343 (2006.01)
G02F 1/1362 (2006.01)

(52) U.S. Cl.
CPC .... G02F 1/134336 (2013.01); G02F 1/13439 (2013.01); G02F 1/136286 (2013.01); *G02F 2001/134345* (2013.01); *G02F 2201/121* (2013.01); *G02F 2201/123* (2013.01);
(Continued)

(58) Field of Classification Search
CPC ............... G02F 1/1368; G02F 1/1362; G02F 1/136286; G02F 1/136227; G02F 1/1343; G02F 1/134309; G02F 1/134336; G02F 1/1333; G02F 1/133345; G02F 1/1335; G02F 1/133514; G02F 1/134363; G02F 1/133707; G02F 2201/121; G02F 2201/123; G02F 2201/40; G02F 2201/52; G02F 2001/134318; G02F 2001/134345; G02F 2001/133357; H01L 27/1259; H01L 27/3262; H01L 27/3276; H01L 29/78669; H01L 29/78678; H01L 29/41733;
(Continued)

(56) References Cited
U.S. PATENT DOCUMENTS 7,936,428 B2 * 5/2011 Takahashi ......... G02F 1/134363 257/59
8,891,050 B2 * 11/2014 Kim .................. G02F 1/134363 349/141

(Continued)

*Primary Examiner* — Thoi Duong
(74) *Attorney, Agent, or Firm* — Andrew C. Cheng

(57) ABSTRACT

The present disclosure proposes an array substrate, an LCD panel, and an LCD. A plurality of subpixels are arranged in the same pixel zone and share the same via hole so that a common electrode can receive scanning voltage. This structure enhances the aperture ratio of a pixel and the light transmittance of a pixel.

15 Claims, 5 Drawing Sheets

(52) U.S. Cl.
CPC ...... *G02F 2201/40* (2013.01); *G02F 2201/52* (2013.01); *G02F 2203/01* (2013.01)

(58) Field of Classification Search
CPC ............. H01L 21/308; H01L 21/32139; H01L 51/5203; G09G 3/3677; G09G 2300/0426
USPC ................... 349/42, 43, 141, 139, 138, 106
See application file for complete search history.

(56) References Cited

U.S. PATENT DOCUMENTS

| | | | |
|---|---|---|---|
| 2009/0207365 A1* | 8/2009 | Lee .................. | G02F 1/134363 349/141 |
| 2016/0062196 A1* | 3/2016 | Takahashi ................ | G09G 3/36 349/43 |

* cited by examiner

ARRAY SUBSTRATE, LIQUID CRYSTAL DISPLAY PANEL, AND LIQUID CRYSTAL DISPLAY

BACKGROUND OF THE INVENTION

1. Field of the Invention

The present invention relates to the field of liquid crystal display, and more particularly, to an array substrate, a liquid crystal display (LCD) panel comprising the array substrate, and an LCD comprising the array substrate.

2. Description of the Prior Art

With the continuous development, LCDs are widely applied to each display field. An array substrate as a key component for an LCD comprises a plurality of pixel zones arranged in a matrix, and each of the plurality of pixel zones comprises a plurality of subpixel zones. In the conventional technology, a common via hole is arranged in each of the plurality of subpixel zones so that a common electrode can receive scanning voltage through the common via hole. However, too many common via holes occupy too many subpixel zones without doubt, which definitely results in a smaller area of the display zone, a lower aperture ratio of a pixel, and a lower light transmittance of a pixel.

SUMMARY OF THE INVENTION

In light of the above-mentioned problem, the present invention proposes an array substrate, an LCD panel comprising the array substrate, and an LCD comprising the array substrate for enhancing the aperture ratio of a pixel and the light transmittance of a pixel.

According to the present invention, an array substrate comprises: a plurality of scanning lines and a plurality of data lines, and the plurality of scanning lines and the plurality of data lines crossing and defining a plurality of first subpixel zones and a plurality of second subpixel zones; a first pixel electrode, arranged in the first subpixel zone; a second pixel electrode, arranged in the second subpixel zone; a common electrode, arranged between the two neighboring first pixel electrodes, and arranged between the first pixel electrode and the second pixel electrode adjacent to the first pixel electrode; a first via hole, arranged in the first subpixel zone and the second subpixel zone, for electrically connecting the first pixel electrode and the data line, and for electrically connecting the second pixel electrode and the data line; a second via hole, arranged in the second subpixel zone, for the common electrode to receive voltage through the second via hole.

Furthermore, the area of the first pixel electrode is larger than the area of the second pixel electrode.

Furthermore, one pixel zone in the array substrate comprises the two first subpixel zones and the one second subpixel zone. The second subpixel zone is one of the red (R), green (G), and blue (B) subpixel zones, and the common electrode receives the voltage through a second via hole in the second subpixel zone in each of the pixel zones.

Furthermore, one pixel zone of the array substrate comprises the three first subpixel zones and the one second subpixel zone. The second subpixel zones is one of red (R), green (G), blue (B), white (W) subpixel zones, and the common electrode receives the voltage through the second via hole in the second subpixel zone in each of the plurality of the pixel zones.

Furthermore, the array substrate comprises the plurality of scanning lines arranged in a row direction, each of the first subpixel zones corresponds to one of the plurality of scanning lines. Each of the second subpixel zones corresponds to one of the plurality of scanning lines. The first subpixel zone and the second subpixel zone located between the nth row and the (n+1)th row are electrically connected to the scanning line in the nth row, and n is a positive integer.

Furthermore, the common electrode, the first pixel electrode, and the second pixel electrode are formed using the same mask process.

Furthermore, the common electrode is overlapped with a corresponding data line, and the common electrode comprises an opaque conductive metallic layer.

Furthermore, the first via hole and the second via hole are arranged at both sides of the scanning line, the first via hole is arranged between the scanning line and the first pixel electrode and between the scanning line and the second pixel electrode.

According to the present invention, a liquid crystal display panel comprises an array substrate. The array substrate comprises: a plurality of scanning lines and a plurality of data lines, and the plurality of scanning lines and the plurality of data lines crossing and defining a plurality of first subpixel zones and a plurality of second subpixel zones; a first pixel electrode, arranged in the first subpixel zone; a second pixel electrode, arranged in the second subpixel zone; a common electrode, arranged between the two neighboring first pixel electrodes, and arranged between the first pixel electrode and the second pixel electrode adjacent to the first pixel electrode; a first via hole, arranged in the first subpixel zone and the second subpixel zone, for electrically connecting the first pixel electrode and the data line, and for electrically connecting the second pixel electrode and the data line; a second via hole, arranged in the second subpixel zone, for the common electrode to receive voltage through the second via hole.

Furthermore, the area of the first pixel electrode is larger than the area of the second pixel electrode.

Furthermore, one pixel zone in the array substrate comprises the two first subpixel zones and the one second subpixel zone. The second subpixel zone is one of the red (R), green (G), and blue (B) subpixel zones, and the common electrode receives the voltage through a second via hole in the second subpixel zone in each of the pixel zones.

Furthermore, one pixel zone of the array substrate comprises the three first subpixel zones and the one second subpixel zone. The second subpixel zones is one of red (R), green (G), blue (B), white (W) subpixel zones, and the common electrode receives the voltage through the second via hole in the second subpixel zone in each of the plurality of the pixel zones.

Furthermore, the array substrate comprises the plurality of scanning lines arranged in a row direction, each of the first subpixel zones corresponds to one of the plurality of scanning lines. Each of the second subpixel zones corresponds to one of the plurality of scanning lines. The first subpixel zone and the second subpixel zone located between the nth row and the (n+1)th row are electrically connected to the scanning line in the nth row, and n is a positive integer.

Furthermore, the common electrode, the first pixel electrode, and the second pixel electrode are formed using the same mask process.

Furthermore, the common electrode is overlapped with a corresponding data line, and the common electrode comprises an opaque conductive metallic layer.

Furthermore, the first via hole and the second via hole are arranged at both sides of the scanning line, the first via hole is arranged between the scanning line and the first pixel electrode and between the scanning line and the second pixel electrode.

According to the present invention, a liquid crystal display comprises a liquid crystal display panel and a backlight module for generating light to the liquid crystal display panel. The liquid crystal display panel comprises an array substrate. The array substrate comprises: a plurality of scanning lines and a plurality of data lines, and the plurality of scanning lines and the plurality of data lines crossing and defining a plurality of first subpixel zones and a plurality of second subpixel zones; a first pixel electrode, arranged in the first subpixel zone; a second pixel electrode, arranged in the second subpixel zone; a common electrode, arranged between the two neighboring first pixel electrodes, and arranged between the first pixel electrode and the second pixel electrode adjacent to the first pixel electrode; a first via hole, arranged in the first subpixel zone and the second subpixel zone, for electrically connecting the first pixel electrode and the data line, and for electrically connecting the second pixel electrode and the data line; a second via hole, arranged in the second subpixel zone, for the common electrode to receive voltage through the second via hole.

As for the array substrate, the LCD panel, and the LCD proposed by the present invention, a plurality of subpixels are arranged in the same pixel zone and share the same via hole so that a common electrode can receive scanning voltage, thereby enhancing the aperture ratio of a pixel and the light transmittance of a pixel.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
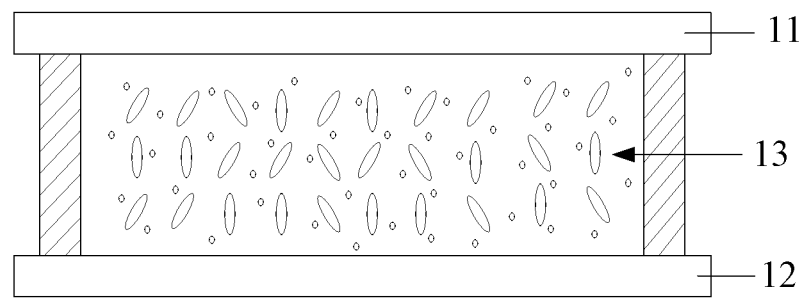
FIG. 1 is a cross-sectional view of the structure of a liquid crystal display (LCD) panel according to one embodiment of the present invention.
Figure 2:
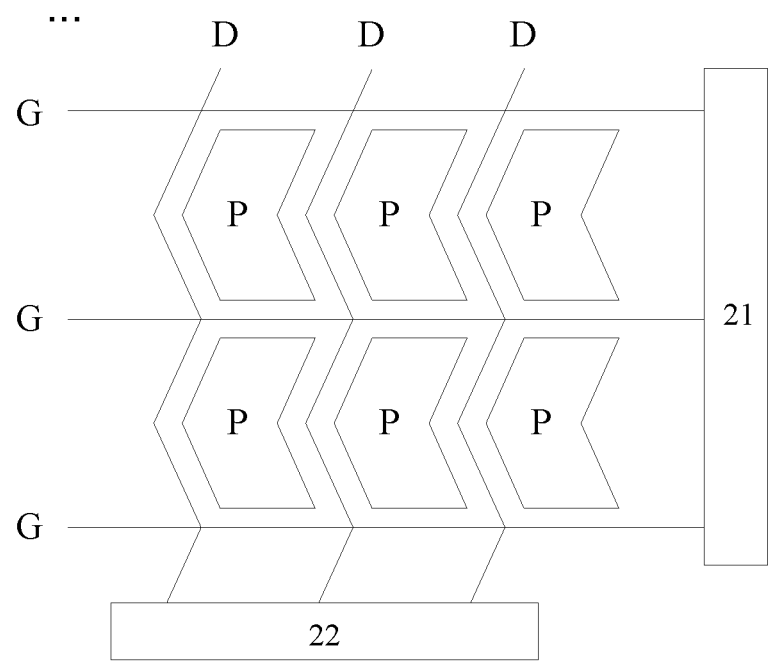
FIG. 2 is a local schematic diagram of the structure of a pixel in the LCD panel according to the embodiment of the present invention.

FIG. 1 is a cross-sectional view of the structure of a liquid crystal display (LCD) panel 10 according to one embodiment of the present invention. FIG. 2 is a local schematic diagram of the structure of a pixel in the LCD panel 10 according to the embodiment of the present invention. The LCD panel 10 comprises a color filter substrate 11, an array substrate 12, and a liquid crystal layer 13. The color filter substrate 11 is spaced apart from the array substrate 12. The liquid crystal layer 13 is stuffed between the color filter substrate 11 and the array substrate 12. The liquid crystal layer 13 is arranged inside a liquid crystal cell formed by overlapping the color filter substrate 11 and the array substrate 12.

The array substrate 12 comprises a plurality of data lines D arranged in a column direction, a plurality of scanning lines G arranged in a row direction, and a plurality of subpixel zones P defined by crossing of the plurality of data lines D and the plurality of scanning lines G. Each of the plurality of subpixel zones P is connected to one of the plurality of data line D correspondingly and one of the plurality of scanning lines G correspondingly. Each of the plurality of scanning lines G is connected to a gate driver 21 for supplying each of the plurality of subpixel zones P with scanning voltage. Each of the plurality of data lines D is connected to a source driver 22 for supplying each of the plurality of subpixel zones P with grayscale voltage. In light of super in-plane switching (S-IPS) is applied to the LCD panel 10 in this embodiment, the pixel with the domain structure is adopted by the array substrate 12. In other words, a subpixel electrode inside each of the plurality of subpixel zones P is a Y-shaped electrode or a V-shaped electrode. Correspondingly, the plurality of data lines D are straight lines while are not arranged in the column direction.

Figure 3:
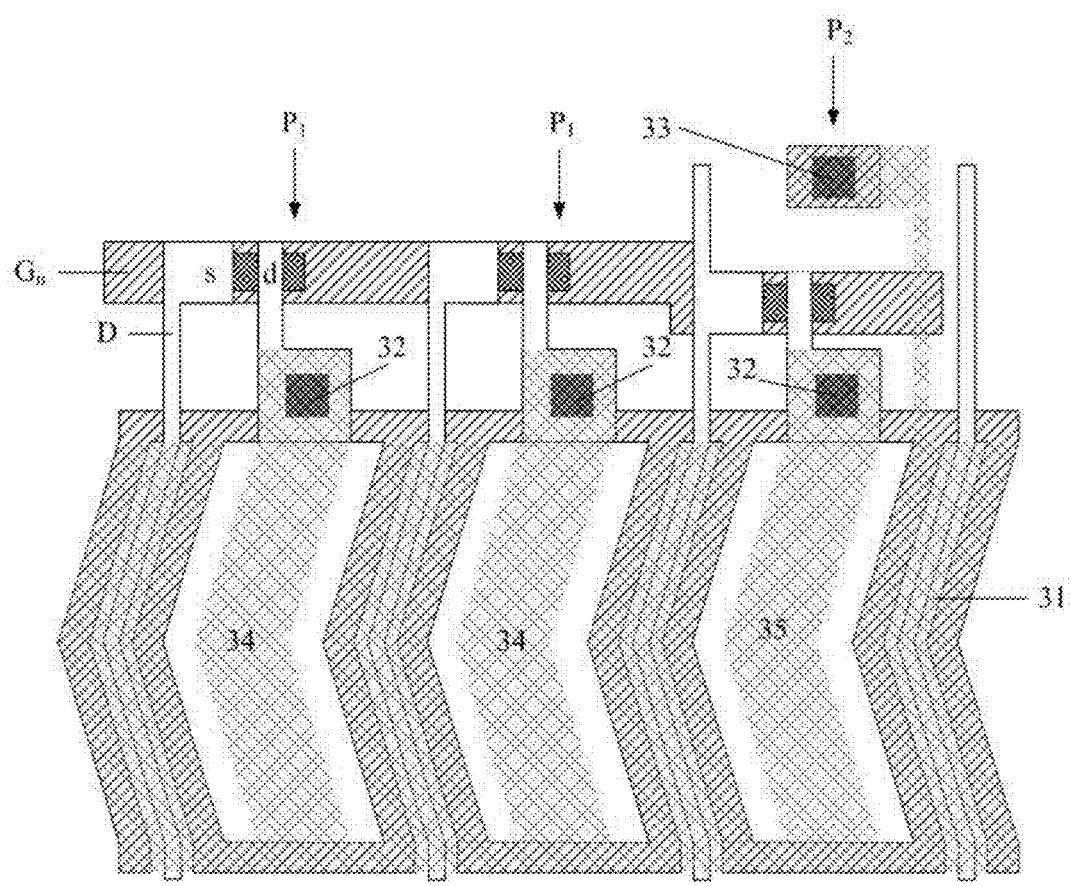
FIG. 3 shows a pixel zone of FIG. 2.

The subpixel zone P comprises a first subpixel zone $P_1$ and a second subpixel zone $P_2$. Take the LCD panel 10 comprising three primary subpixels—red (R) subpixel, green (G) subpixel, and blue (B) subpixel—for example. The second subpixel zone $P_2$ corresponds to a blue (B) subpixel zone. The first subpixel zone $P_1$ corresponds to a red (R) subpixel zone and a green (G) subpixel zone. A second subpixel zone $P_2$ and two adjacent first subpixel zones $P_1$ form a pixel zone of the array substrate 12. In light of the structures of a plurality of pixel zones arranged in a matrix identical, a pixel zone located at the nth row as shown in FIG. 3 will be elaborated in the following description. It is notified that n is a positive integer.

Please refer to FIG. 3. The two first subpixel zones $P_1$ and the one second subpixel zone $P_2$ arranged between the nth row and the (n+1)th row are all connected to the scanning line $G_n$ in the nth row. The array substrate 12 comprises a common electrode 31, a first via hole 32, a second via hole 33, a first pixel electrode 34 in the first subpixel zone $P_1$, and a second pixel electrode 35 in the second subpixel zone $P_2$. The common electrode 31 is arranged between two neighboring first pixel electrodes 34 and between a first pixel electrode 34 and a second pixel electrode 35 adjacent to the first pixel electrode 34. The first via hole 32 is arranged in the first subpixel zone $P_1$ and the second subpixel zone $P_2$. Specifically, the first via hole 32 in the first subpixel zone $P_1$ is arranged between the scanning line $G_n$ and the first pixel electrode 34. The first via hole 32 is a pixel via hole for electrically connecting the first pixel electrode 34 and a data line D corresponding to the first pixel electrode 34. Specifically, the first via hole 32 in the second subpixel zone $P_2$ is arranged between the scanning line $G_n$ and the second pixel electrode 35. The first via hole 32 is used for electrically connecting the second pixel electrode 35 and a data line D corresponding to the second pixel electrode 35. The second via hole 33 is arranged in the second subpixel zone $P_2$, and the second via hole 33 and the first via hole 32 are arranged at both sides of the scanning line $G_n$. The second via hole 33 is a common via hole. The common electrode 31 receives voltage, which may be scanning voltage, through the second via hole 33. The second via hole 33 is arranged in the second subpixel zone $P_2$ while not in the second pixel electrode 35, so the area of the first pixel electrode 34 is larger than the area of second pixel electrode 35.

The common electrode 31 in the second subpixel zones $P_2$ receives the voltage through the second via hole 33. The common electrode 31 in the first subpixel zone $P_1$ is electrically connected to the common electrode 31 in the second subpixel zones $P_2$ through a periphery wire. Preferably, the periphery wire overlaps with a scanning line $G_n$ or a scanning line $G_{n+1}$.

Therefore, a plurality of subpixels (subpixel electrodes) in the same pixel zone shares the same via hole so that the common electrode 31 can receive the voltage through the via hole. Compared with the conventional technology, the number of via holes used in the present invention is fewer. The decrease in the number of via holes is good for enhancing the aperture ratio of a pixel and the light transmittance of a pixel.

The R subpixel and G subpixel do not comprise the common via hole (the second via hole 33) in the above-mentioned pixel structure. So, compared with conventional technology, the area of the first pixel electrode 34 is larger, the aperture ratio of a pixel is larger, and the light transmittance of a pixel is larger in the present invention. The reason why the second via hole 33 is arranged in the B subpixel in this embodiment is that blue light can penetrate the B subpixel. The display brightness of the LCD panel 10 benefits from the blue light less than from the red light and green light. Even if the area of the second pixel electrode 35 reduces, the influence on the light transmittance of the entire pixel is not obvious.

The second via hole 33 is arranged in the R subpixel zone or the G subpixel zone in other embodiments.

In addition, for the LCD panel 10 comprising the red (R), green (G), blue (B), white (W) subpixels, one of the pixel zones in the array substrate 12 comprises three first subpixel zones $P_1$ and one second subpixel zone $P_2$. The second subpixel zones $P_2$ is one of R, G, B, Wsubpixel zones, for example, the B subpixel zone. In each of the pixel zones, the common electrode 31 receives voltage through the second via hole 33 in the second subpixel zone $P_2$.

Figure 4:
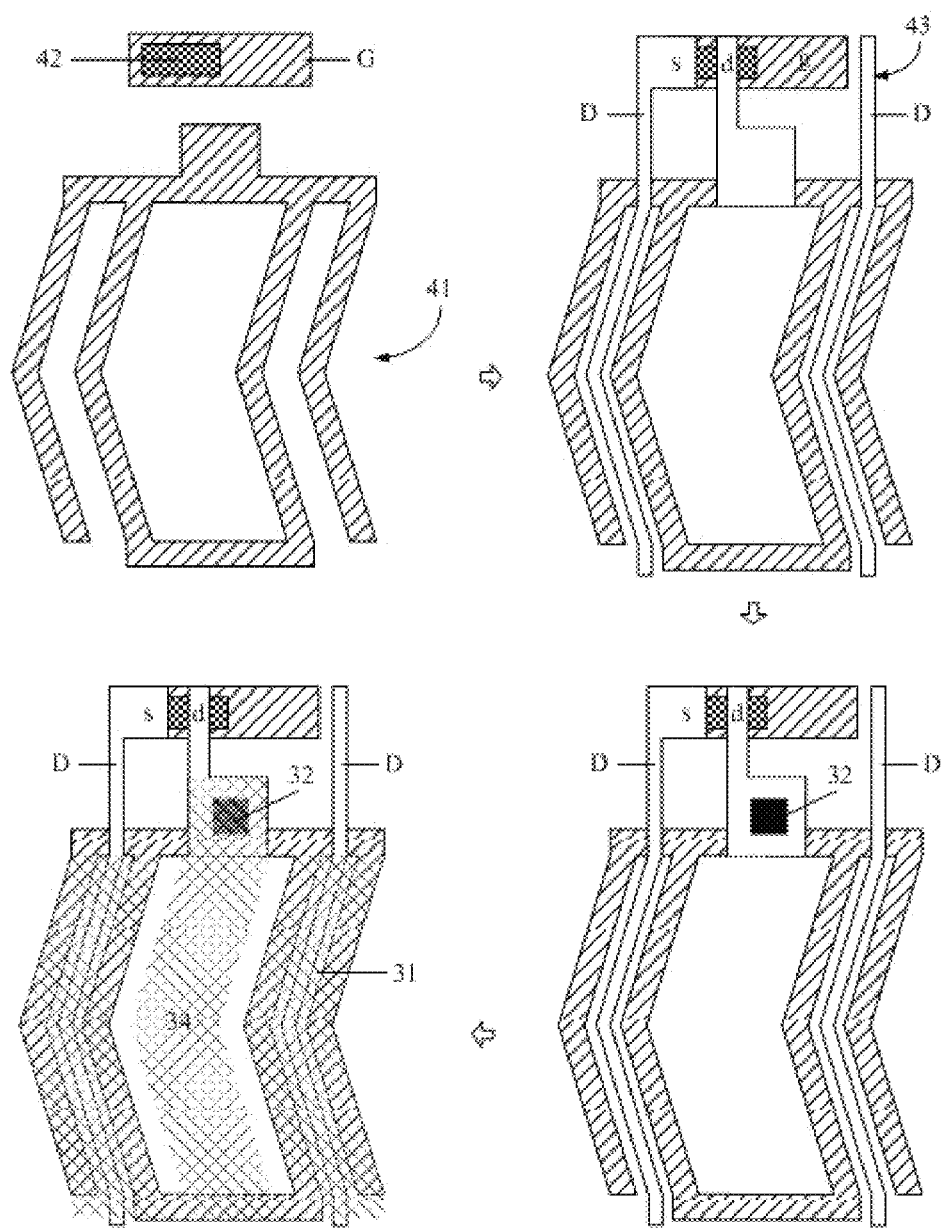
FIG. 4 is a schematic diagram of formation of a first pixel zone according to one embodiment of the present invention.

FIG. 4 is a schematic diagram of formation of a first pixel zone $P_1$ according to one embodiment of the present invention. To form the first subpixel zone $P_1$ comprises steps of:

Forming a first metallic layer 41 with a predetermined pattern. The first metallic layer 41 is used for forming a scanning line G, a gate g of a thin film transistor (TFT) in the array substrate 12, a metallic layer corresponding to a first via hole 32, and other metallic wires.

Forming an active semiconductor (AS) layer 42 of the TFT on the first metallic layer 41. The AS layer 42 is arranged over the gate g.

Forming a second metallic layer 43 with a predetermined pattern on the AS layer 42. The second metallic layer 43 is used for forming a data line D, a source s of the TFT, and a drain d of the TFT.

Forming a flat passivation layer on the second metallic layer 43, and mounting a first via hole 32 on the flat passivation layer.

Forming a first pixel electrode 34 and a common electrode 31 on the flat passivation layer where the first via hole 32 is mounted. Preferably, the common electrode 31 and the first pixel electrode 34 are formed using the same mask process. The common electrode 31 is a transparent conducting layer and may be fabricated from indium tin oxide (ITO).

Figure 5:
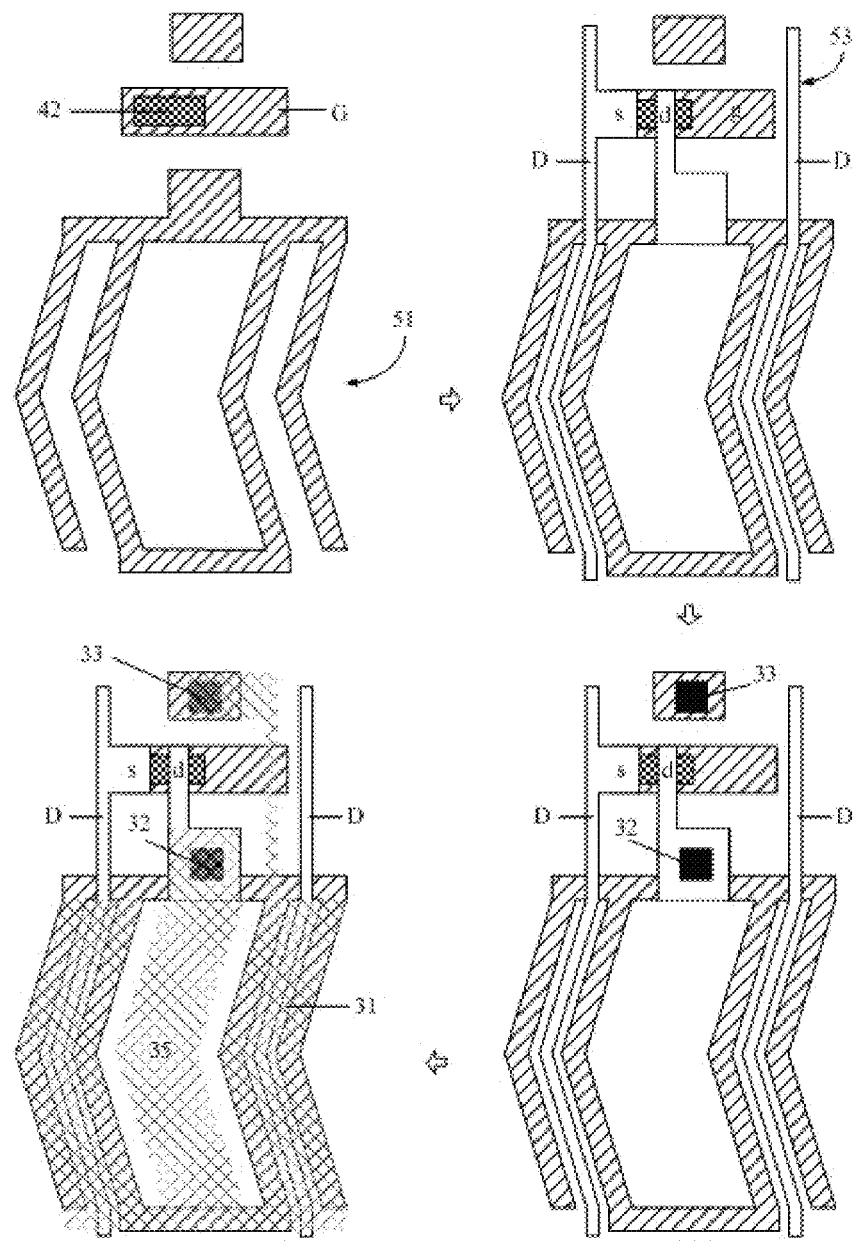
FIG. 5 is a schematic diagram of formation of a first pixel zone according to one embodiment of the present invention.
Figure 6:
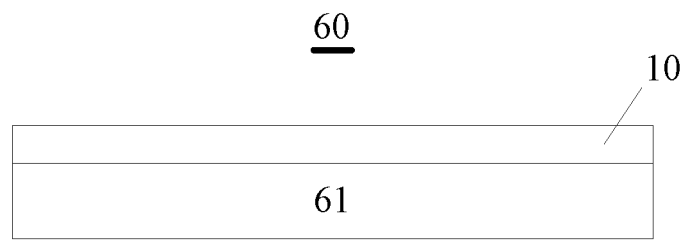
FIG. 6 is a cross-sectional view of a liquid crystal display according to one embodiment of the present invention.

FIG. 5 is a schematic diagram of formation of a first pixel zone according to one embodiment of the present invention. As FIG. 5 shows, to form a second subpixel zone $P_2$ in this embodiment comprises steps of:

Forming a first metallic layer 51 with a predetermined pattern. The first metallic layer 51 is used for forming a scanning line G, a gate g of a thin film transistor (TFT), a metallic layer corresponding to a first via hole 32, a metallic layer corresponding to a second via hole 33, and other metallic wires.

Forming an active semiconductor (AS) layer 52 on the first metallic layer 51. The AS layer 52 is arranged over the gate g.

Forming a second metallic layer 53 with a predetermined pattern on the AS layer 52. The second metallic layer 53 is used for forming a data line D, a source s of the TFT, and a drain d of the TFT.

Forming a flat passivation layer on the second metallic layer 53. Not only a first via hole 32 but also a second via hole 33 are mounted on the flat passivation layer.

Forming a second pixel electrode 35 and a common electrode 31 on the flat passivation layer where the first via hole 32 and the second via hole 33 are mounted. The common electrode 31 and the second pixel electrode 35 are formed in the same mask process. The common electrode 31 is a transparent conducting layer. The common electrode 31 is fabricated from, but is not limited to, indium tin oxide (ITO). In another embodiment, a common electrode 31 is formed in a single mask process or in other processes. The common electrode 31 is overlapped with its corresponding data line D. In other words, it is possible that the common electrode 31 is an opaque conductive metallic layer.

The first subpixel zone $P_1$ and the second subpixel zone $P_2$ are not formed independently. Combined FIG. 4 with FIG. 5, the first metallic layers 41 and 51 may be formed in the same mask process. Besides, the AS layers 42 and 52 may be formed in the same process. The second metallic layers 43 and 53 may be formed in the same mask process. The flat passivation layers may be formed in the same process. The second via hole 33 and the first via hole 32 may be formed in the same process. The common electrode 31, the first pixel electrode 34, and the second pixel electrode 35 may be formed in the same mask process as well.

A liquid crystal display (LCD) 60 is further proposed by the embodiment of the present invention. The LCD 60 comprises the above-mentioned LCD panel 10 and a backlight module 61 which supplies the LCD panel 10 with light. The LCD 60 comprises the above-mentioned array substrate 12. Therefore, the LCD 60 has the same beneficiary effect provided by the array substrate 12.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. An array substrate, comprising:
   a plurality of scanning lines and a plurality of data lines, and the plurality of scanning lines and the plurality of data lines crossing and defining a plurality of first subpixel zones and a plurality of second subpixel zones;
   a first pixel electrode, arranged in the first subpixel zone;
   a second pixel electrode, arranged in the second subpixel zone;

a common electrode, arranged between the two neighboring first pixel electrodes, and arranged between the first pixel electrode and the second pixel electrode adjacent to the first pixel electrode;

a first via hole, arranged in the first subpixel zone and the second subpixel zone, for electrically connecting the first pixel electrode and the data line, and for electrically connecting the second pixel electrode and the data line;

a second via hole, arranged in the second subpixel zone, for the common electrode to receive voltage through the second via hole, wherein the first via hole and the second via hole are arranged at both sides of the scanning line, the first via hole is arranged between the scanning line and the first pixel electrode and between the scanning line and the second pixel electrode.

2. The array substrate of claim 1, wherein the area of the first pixel electrode is larger than the area of the second pixel electrode.

3. The array substrate of claim 1, wherein one pixel zone in the array substrate comprises the two first subpixel zones and the one second subpixel zone, the second subpixel zone is one of the red (R), green (G), and blue (B) subpixel zones, and the common electrode receives the voltage through a second via hole in the second subpixel zone in each of the pixel zones.

4. The array substrate of claim 1, wherein one pixel zone of the array substrate comprises the three first subpixel zones and the one second subpixel zone, the second subpixel zones is one of red (R), green (G), blue (B), white (W) subpixel zones, and the common electrode receives the voltage through the second via hole in the second subpixel zone in each of the plurality of the pixel zones.

5. The array substrate of claim 1, wherein the array substrate comprises the plurality of scanning lines arranged in a row direction, each of the first subpixel zones corresponds to one of the plurality of scanning lines, each of the second subpixel zones corresponds to one of the plurality of scanning lines, the first subpixel zone and the second subpixel zone located between the nth row and the (n+1)th row are electrically connected to the scanning line in the nth row, and n is a positive integer.

6. The array substrate of claim 5, wherein the common electrode, the first pixel electrode, and the second pixel electrode are formed using the same mask process.

7. The array substrate of claim 5, wherein the common electrode is overlapped with a corresponding data line, and the common electrode comprises an opaque conductive metallic layer.

8. A liquid crystal display panel comprising an array substrate, the array substrate comprising:

a plurality of scanning lines and a plurality of data lines, and the plurality of scanning lines and the plurality of data lines crossing and defining a plurality of first subpixel zones and a plurality of second subpixel zones;

a first pixel electrode, arranged in the first subpixel zone;

a second pixel electrode, arranged in the second subpixel zone;

a common electrode, arranged between the two neighboring first pixel electrodes, and arranged between the first pixel electrode and the second pixel electrode adjacent to the first pixel electrode;

a first via hole, arranged in the first subpixel zone and the second subpixel zone, for electrically connecting the first pixel electrode and the data line, and for electrically connecting the second pixel electrode and the data line;

a second via hole, arranged in the second subpixel zone, for the common electrode to receive voltage through the second via hole, wherein the first via hole and the second via hole are arranged at both sides of the scanning line, the first via hole is arranged between the scanning line and the first pixel electrode and between the scanning line and the second pixel electrode.

9. The liquid crystal display panel of claim 8, wherein the area of the first pixel electrode is larger than the area of the second pixel electrode.

10. The liquid crystal display panel of claim 8, wherein one pixel zone in the array substrate comprises the two first subpixel zones and the one second subpixel zone, the second subpixel zone is one of the red (R), green (G), and blue (B) subpixel zones, and the common electrode receives the voltage through a second via hole in the second subpixel zone in each of the pixel zones.

11. The array substrate of claim 8, wherein one pixel zone of the array substrate comprises the three first subpixel zones and the one second subpixel zone, the second subpixel zone is one of red (R), green (G), blue (B), white (W) subpixel zones, and the common electrode receives the voltage through the second via hole in the second subpixel zone in each of the plurality of the pixel zones.

12. The liquid crystal display panel of claim 8, wherein the array substrate comprises the plurality of scanning lines arranged in a row direction, each of the first subpixel zones corresponds to one of the plurality of scanning lines, each of the second subpixel zones corresponds to one of the plurality of scanning lines, the first subpixel zone and the second subpixel zone located between the nth row and the (n+1)th row are electrically connected to the scanning line in the nth row, and n is a positive integer.

13. The liquid crystal display panel of claim 12, wherein the common electrode, the first pixel electrode, and the second pixel electrode are formed using the same mask process.

14. The liquid crystal display panel of claim 12, wherein the common electrode is overlapped with a corresponding data line, and the common electrode comprises an opaque conductive metallic layer.

15. A liquid crystal display comprising a liquid crystal display panel and a backlight module for generating light to the liquid crystal display panel, the liquid crystal display panel comprising an array substrate, the array substrate comprising:

a plurality of scanning lines and a plurality of data lines, and the plurality of scanning lines and the plurality of data lines crossing and defining a plurality of first subpixel zones and a plurality of second subpixel zones;

a first pixel electrode, arranged in the first subpixel zone;

a second pixel electrode, arranged in the second subpixel zone;

a common electrode, arranged between the two neighboring first pixel electrodes, and arranged between the first pixel electrode and the second pixel electrode adjacent to the first pixel electrode;

a first via hole, arranged in the first subpixel zone and the second subpixel zone, for electrically connecting the first pixel electrode and the data line, and for electrically connecting the second pixel electrode and the data line;

a second via hole, arranged in the second subpixel zone, for the common electrode to receive voltage through the second via hole, wherein the first via hole and the second via hole are arranged at both sides of the scanning line, the first via hole is arranged between the scanning line and the first pixel electrode and between the scanning line and the second pixel electrode.

* * * * *